(No Model.)
H. M. CALDWELL.
CONNECTING LINK FOR SPROCKET CHAINS.
No. 580,449. Patented Apr. 13, 1897.
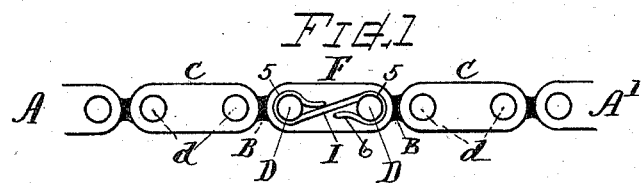
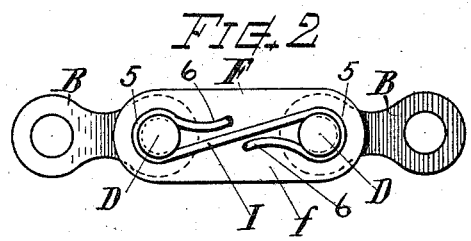
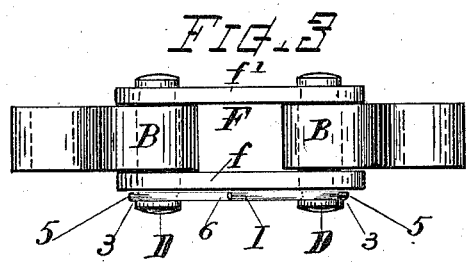
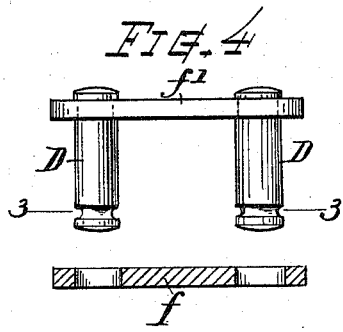
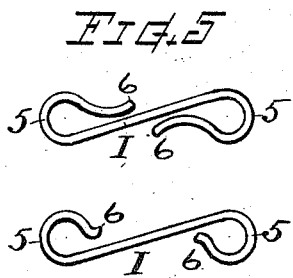
Witnesses
Charles A. Bacon
Simeon E. King
Inventor.
Homer M. Caldwell
By Chas. H. Burleigh
Attorney

UNITED STATES PATENT OFFICE.

HOMER M. CALDWELL, OF WORCESTER, MASSACHUSETTS.

CONNECTING-LINK FOR SPROCKET-CHAINS.

SPECIFICATION forming part of Letters Patent No. 580,449, dated April 13, 1897.

Application filed July 11, 1896. Serial No. 598,787. (No model.)

*To all whom it may concern:*

Be it known that I, HOMER M. CALDWELL, a citizen of the United States, residing at Worcester, in the county of Worcester and State of Massachusetts, have invented a new and useful Improvement in Connecting-Links for Sprocket-Chains, of which the following, together with the accompanying drawings, is a specification sufficiently full, clear, and exact to enable persons skilled in the art to which this invention appertains to make and use the same.

The object of my present invention is to afford a practical and desirable parting link or means for uniting and disuniting the ends of bicycle sprocket-chains to facilitate the ready and convenient removal and replacing of the chain upon the sprocket-wheels when desired; also, to provide a simple, efficient, and inexpensive locking device for retaining the side link upon the pivot-pins, a locking device that can be removed and replaced without requiring the use of a special tool, and which will not become deranged by the jar and working of the chain when in use. These objects I attain by the mechanism illustrated in the drawings, wherein—

Figure 1 is a side view of so much of a bicycle sprocket-chain as will illustrate the nature of my invention. Fig. 2 is a side view, on a larger scale, showing the parting link with my improved locking device thereon. Fig. 3 is a top view of the same. Fig. 4 shows the link separated, the removable side plate being in section; and Fig. 5 shows the locking device separate from the link, two forms being illustrated.

Referring to parts, A and A' indicate the respective end portions of a sprocket-chain to be united for endless action or disunited for ready release from the sprocket-wheels of the bicycle at the pleasure of the operator. The links B and C of such chain may be formed and arranged in well-known or suitable manner, the side links in the present instance being as shown at C and the blocks or intermediate links as shown at B. Said parts are connected by pivots or hinging-pins $d$, that extend through the links laterally and are confined therein, as heretofore practiced.

F indicates my parting link for facilitating the separation and uniting of the portions A A'. Said parting link comprises the rear link-plate $f'$, having the pivot-pins D D secured therein in such manner that they cannot draw out endwise, and the removable front link-plate $f$, having holes adapted to easily pass over the ends of the pivot-pins D. The pivot-pins D are each formed with a shallow groove or channel 3 about the neck thereof at a position just outside of the plate $f$ when the parts are assembled. Said groove is preferably of semicircular form, but may be of other cross-section shape when desired.

I indicates the locking device, which is a feature of my invention, and consists of a small resilient rod or wire having its two ends bent in the form of circular loops 5, that normally correspond in size to the diameter of the grooved necks of the studs D D, while the body portion of the lock device corresponds to the distance relation of said pivots D D from each other. The ends 6 of the wire are turned backward in the same plane with the loops and extend along the body-bar, as indicated. These ends 6 may be made longer or shorter, as shown by the two examples, Fig. 5. The extremities are slightly turned outward, so that the end can be caught by the thumb-nail. This lock device is preferably made from round music spring-wire or wire of similar nature, shaped in either round, square, or other suitable section.

The loops 5 are best formed at opposite sides of the central or body portion, so that any tendency to lift one loop from the plate will at the same time tend to depress the other toward the plate, thus rendering the lock quite secure without requiring high tension of resilience in the device.

When assembling the parts for uniting the ends of the chain, the pivots D D are inserted through the blocks B and the removable side plate $f$ is placed upon the pivots. The lock device I is then adjusted by springing its looped portions 5 over the ends of the pivots and allowing the loop to spring or close into the grooves 3, thereby confining the side link $f$ securely in place. When it is desired to separate the chain, the operator by means of his thumb-nail or any suitable means springs outward the end 6 of the lock device, thereby expanding the loop 5, releasing it from the groove 3, and freeing the device from the pivot-pins D D, after which the removable side plate can be taken off and the pivots slipped from the links B, the operation of disconnecting or uniting the chain being the work of but a moment, and it can be readily performed by any person without requiring the aid of special tools therefor. This lock device is simple, inexpensive, and very efficient and is not liable to become loose or disconnected by the jar and working of the chain in use.

What I claim, and desire to secure by Letters Patent, is—

1. In a sprocket-chain, the combination with the removable side link, and the pivot-pins having grooves about the ends thereof; of a lock device consisting of a resilient wire having its ends bent to form circular end loops with backwardly-returned extremities, said loops adapted to pass over the grooved ends of the pivot-pins and engage by spring action within said grooves.

2. The locking device consisting of the resilient wire formed with the oppositely-directed circular bends all in the same plane and having their ends turned backward toward the body, as shown, and adapted for springing open the circular bend; in combination with the removable chain-link, and the pivot-pins at the respective ends of the chain-link, said pivots each provided with a nick, groove or depression, for the reception of said locking-wire, adjacent to the exterior of the chain-link, as set forth.

Witness my hand this 8th day of July, A. D. 1896.

HOMER M. CALDWELL.

Witnesses:
CHAS. H. BURLEIGH,
CHARLES S. BACON.